United States Patent
Gniadek et al.

(10) Patent No.: US 11,609,388 B2
(45) Date of Patent: Mar. 21, 2023

(54) OPTICAL FIBER CONNECTOR WITH CHANGEABLE POLARITY

(71) Applicant: Senko Advanced Components, Inc., Marlborough, MA (US)

(72) Inventors: Jeffrey Gniadek, Oxford, ME (US); Kim Man Wong, Kowloon (HK); Yim Wong, Kowloon (HK); Jimmy Chang, Worcester, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 88 days.

(21) Appl. No.: 17/161,556

(22) Filed: Jan. 28, 2021

(65) Prior Publication Data

US 2021/0149126 A1 May 20, 2021

Related U.S. Application Data

(63) Continuation of application No. 16/707,532, filed on Dec. 9, 2019, now Pat. No. 11,079,557, which is a continuation of application No. 15/601,308, filed on May 22, 2017, now Pat. No. 10,539,750, which is a continuation of application No. 14/637,314, filed on Mar. 3, 2015, now Pat. No. 9,658,409.

(51) Int. Cl.
*G02B 6/38* (2006.01)

(52) U.S. Cl.
CPC ......... *G02B 6/3895* (2013.01); *G02B 6/3831* (2013.01); *G02B 6/3885* (2013.01); *G02B 6/3825* (2013.01); *G02B 6/3893* (2013.01)

(58) Field of Classification Search
CPC .. G02B 6/3895; G02B 6/3825; G02B 6/3885; G02B 6/3893
See application file for complete search history.

(56) References Cited

U.S. PATENT DOCUMENTS

| 4,150,790 A | 4/1979 | Potter |
| 4,327,964 A | 5/1982 | Haesly et al. |
| 4,478,473 A | 10/1984 | Frear |

(Continued)

FOREIGN PATENT DOCUMENTS

| CA | 2495693 C | 1/2013 |
| CN | 2836038 Y | 11/2006 |

(Continued)

OTHER PUBLICATIONS

"Fiber Optic Interconnect Solutions, Tactical Fiber Optic Connectors, Cables and Termini" 2006, Glenair, Inc., Glendale, California, wvvw.mps-electronics.de/fileadmin/files/MPS-E/Produkte/Katalog/Glenair/KatalogGlenair-LWL1110.pdf.

(Continued)

*Primary Examiner* — John Bedtelyon

(57) ABSTRACT

A multi-fiber, fiber optic connector may include a reversible keying arrangement for determining the orientation for plugging the connector into an adapter to thereby allow for a change in polarity of the connection to be made on site. The connector housing may be configured to engage with a removable key that may be engaged with the housing in at least two different locations to provide the plug-in orientation, or the housing may have slidably displaceable keys movable between multiple positions on the housing.

15 Claims, 17 Drawing Sheets

(56) References Cited

U.S. PATENT DOCUMENTS

| | | |
|---|---|---|
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber et al. |
| 5,041,025 A | 8/1991 | Haitmanek |
| D323,143 S | 1/1992 | Ohkura et al. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,335,301 A | 8/1994 | Newman et al. |
| 5,348,487 A | 9/1994 | Marazzi et al. |
| 5,444,806 A | 8/1995 | De Marchi et al. |
| 5,481,634 A | 1/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | Mcdonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,636,424 B2 | 1/2014 | Kuffel et al. |
| 8,651,749 B2 | 2/2014 | Dainese Jnior et al. |
| 8,770,863 B2 | 7/2014 | Cooke et al. |
| 9,829,645 B2 * | 11/2017 | Good .................. G02B 6/3883 |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | De Jong et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek et al. |
| 2010/0034502 A1 | 2/2010 | Lu et al. |
| 2010/0092136 A1 | 4/2010 | Nhep |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0099822 A1 | 4/2012 | Kuffel et al. |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2013/0322825 A1 | 12/2013 | Cooke et al. |
| 2014/0016901 A1 | 1/2014 | Lambourn et al. |
| 2014/0023322 A1 | 1/2014 | Gniadek |
| 2014/0050446 A1 | 2/2014 | Chang |
| 2014/0133808 A1 | 5/2014 | Hill et al. |
| 2014/0334780 A1 | 11/2014 | Nguyen et al. |
| 2014/0348477 A1 | 11/2014 | Chang |
| 2015/0003785 A1 | 1/2015 | Raven et al. |
| 2015/0378113 A1 | 12/2015 | Good et al. |

(56) References Cited

U.S. PATENT DOCUMENTS

FOREIGN PATENT DOCUMENTS

| | | | |
|---|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001079904 | 10/2001 |
| WO | 2004027485 A1 | 4/2004 |
| WO | 2008112986 A1 | 9/2008 |
| WO | 2009135787 A1 | 11/2009 |
| WO | 2010024851 A2 | 3/2010 |
| WO | 2012136702 A1 | 10/2012 |
| WO | 2012162385 A1 | 11/2012 |
| WO | 2013052070 A1 | 4/2013 |
| WO | 2014028527 A2 | 2/2014 |
| WO | 2014182351 A1 | 11/2014 |

OTHER PUBLICATIONS

"Fiber Optic Products Catalog" Nov. 2007, Tyco Electronics Corporation, Harrisburg, Pennsylvania, www.ampnetconnect.com/documents/Fiber/020Optice/020Catalog/0201107.pd f.

International Search Report and Written Opinion dated Aug. 21, 2008 for PCT/US2008/057023.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Aug. 29, 2014 for PCT/US2014/041500.

International Search Report and Written Opinion dated Jan. 16, 2014 for PCT/US2013/54784.

International Search Report and Written Opinion dated May 14, 2014 for PCT/US2014/012137.

International Search Report and Written Opinion dated Aug. 22, 2016 from corresponding International Application go. PCT/US15/59458, International Filing Date Nov. 6, 2015.

Extended European Search Report in related Application No. 15884159.3 dated Sep. 3, 2018, 8 pages.

Office Action issued for Taiwanese Patent Application No. 104140112 dated Oct. 8, 2019, 11 pages.

International Preliminary Report on Patentability dated Sep. 14, 2017 from related International Application No. 3CT/US2015/059458, International Filing Date Nov. 6, 2015.

Fiberoptic Connectors and Assemblies Catalog 2009, Huber & Suhner Fiber Optics, Herisau, Switzerland, www.ioogle.co.in/url?sa=t&source=web&cd=63&ved=OCCMQ9ACODw&url=http%3A%2P/02Fwww.hubersuhner.com%2Fwrite rtn binary_pdr/o3Fbinaryid%3D8DBC7DE2EB72D315%26binarytype%3D484 DKA363AEB7E&ei=ZvcvTujWH4ntrAfH-dXZCg&usg=AFQJCNE1MdC-4avewRJU6IDVc WYbrOQQ.

European Search Report and Written Opinion dated Feb. 19, 2015 for EP 14168005.

European Search Report and Written Opinion dated Mar. 3, 2015 for EP 14187661.

\* cited by examiner

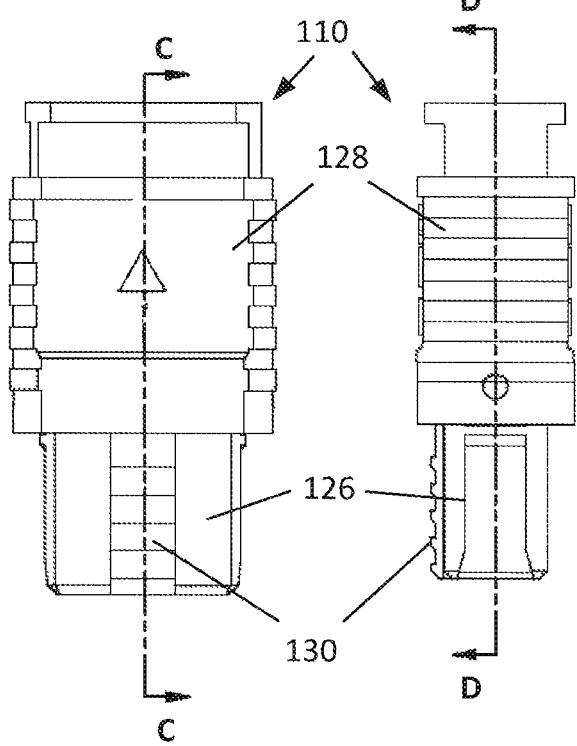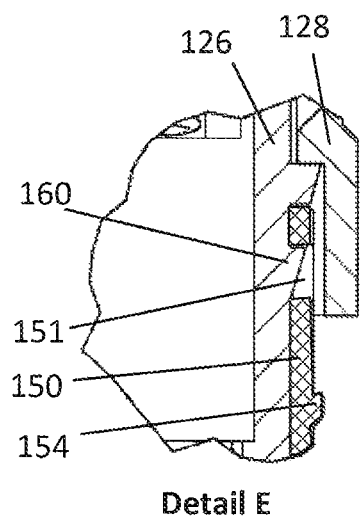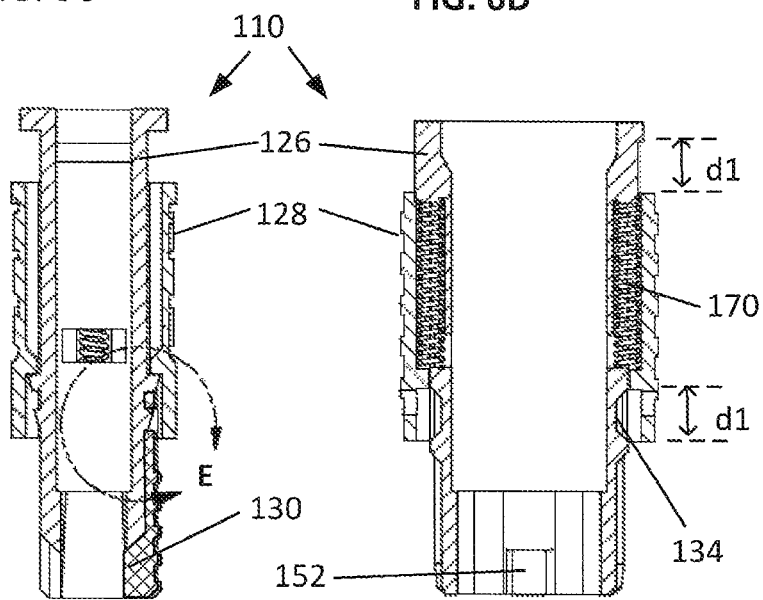

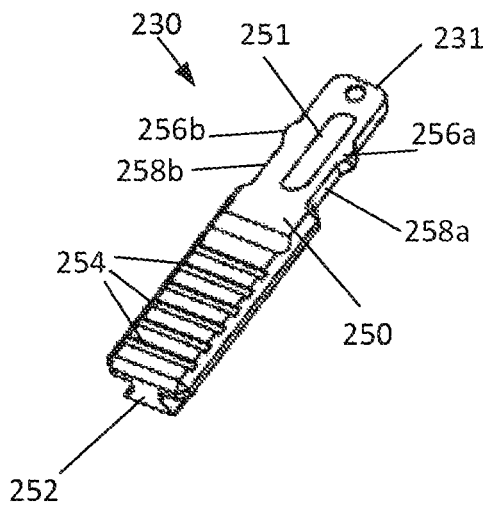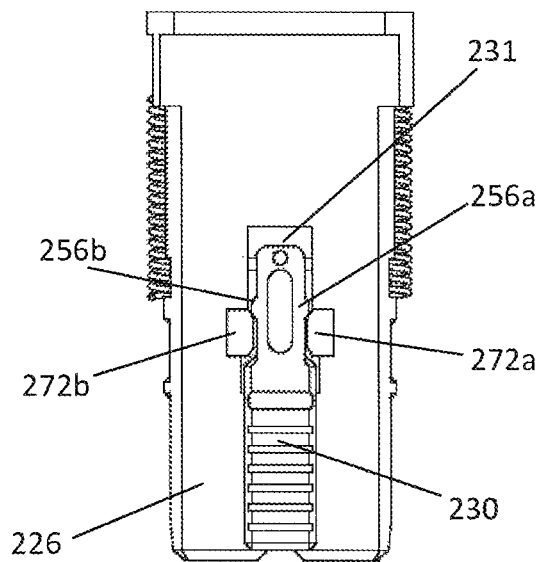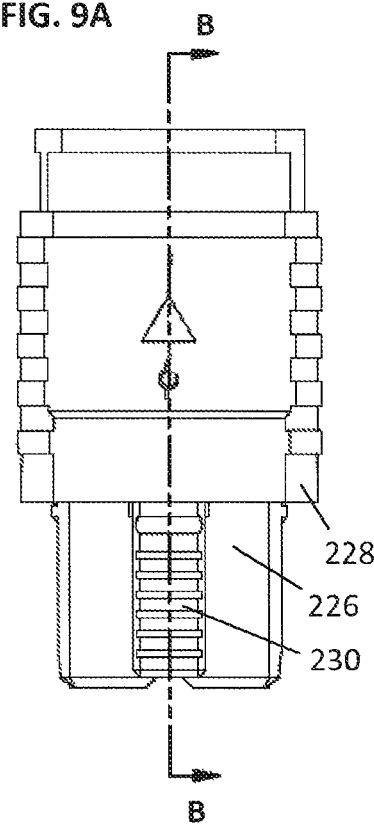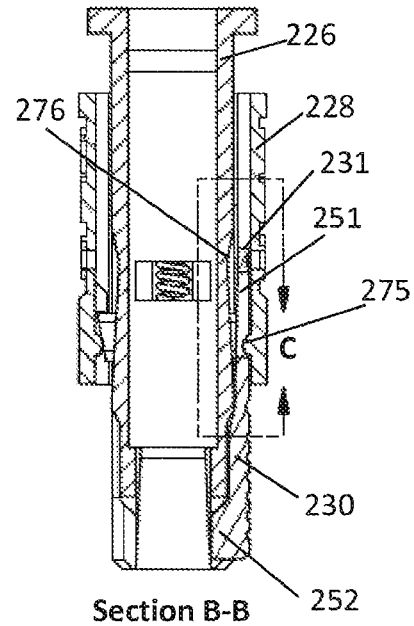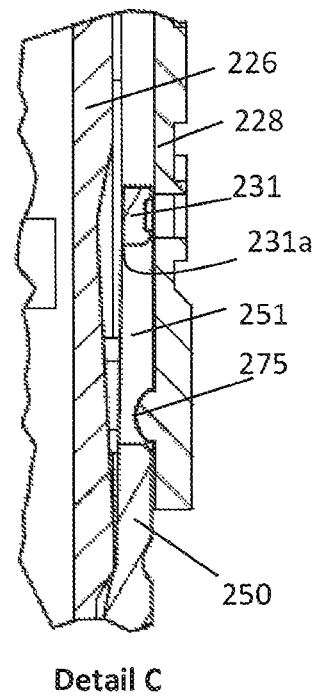

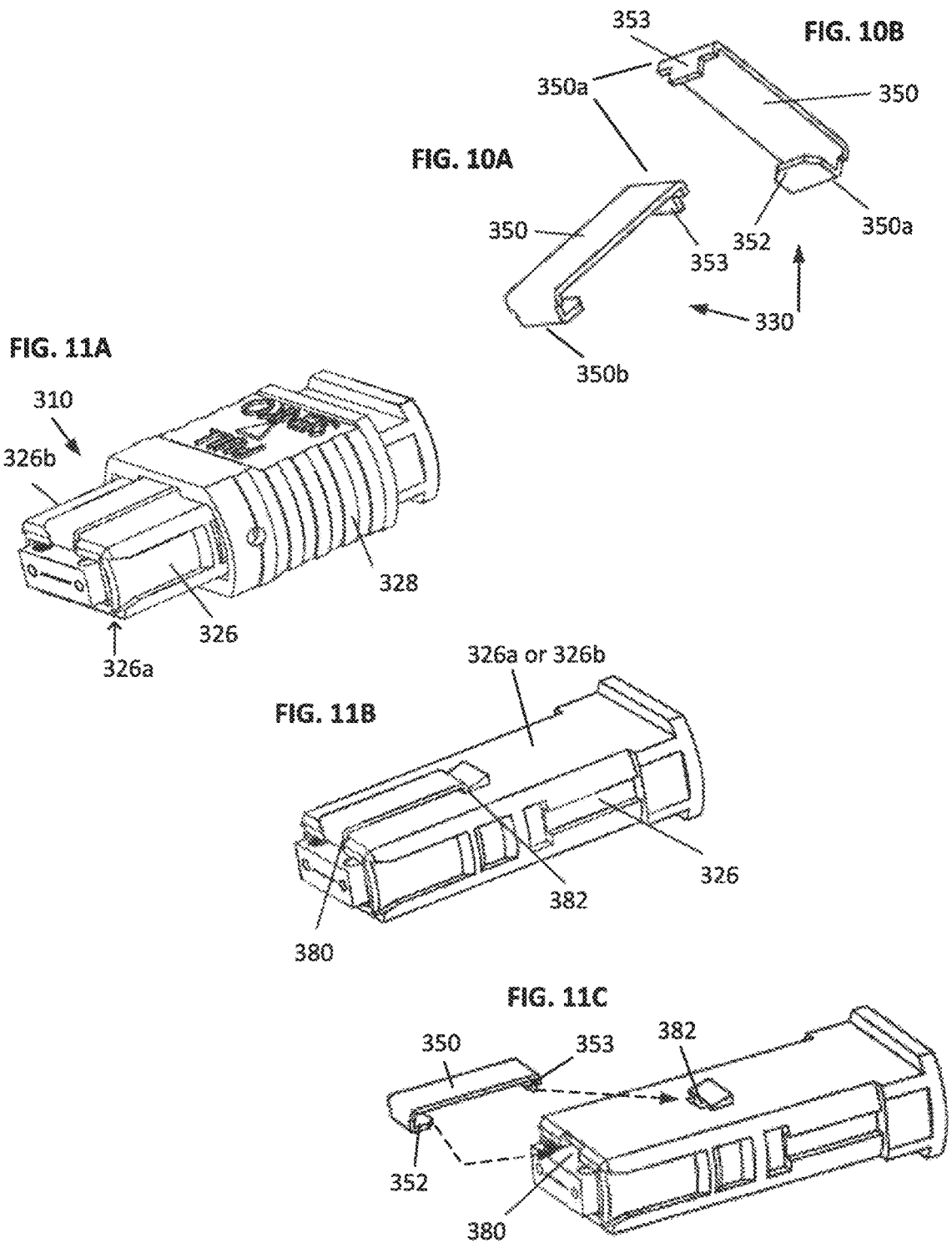

Section B-B

Detail C

FIG. 16A 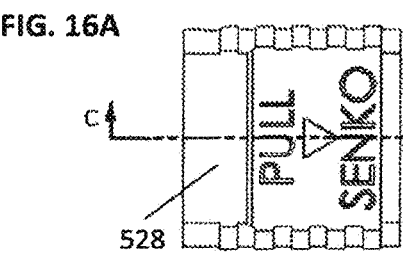 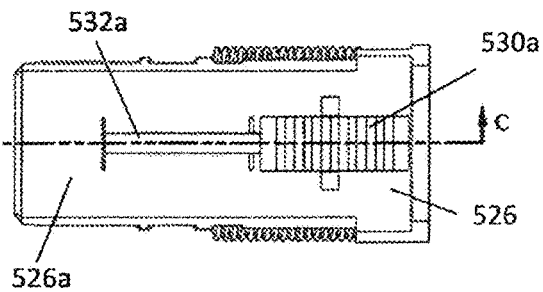
FIG. 16B 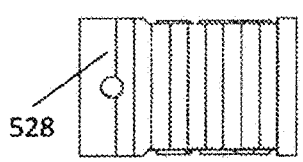 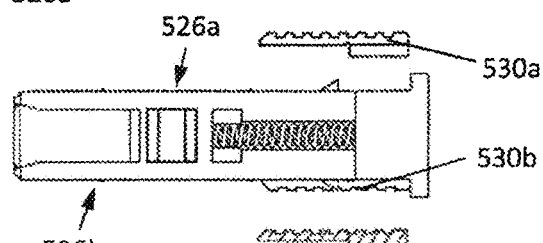
FIG. 16C 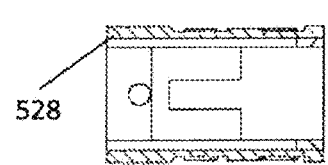 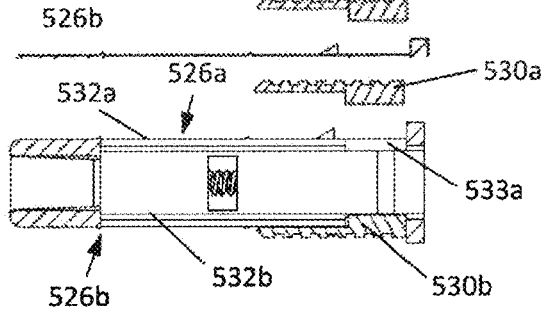
FIG. 17A 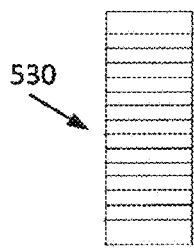  FIG. 17B 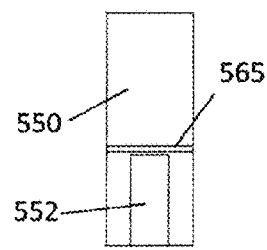  FIG. 17C 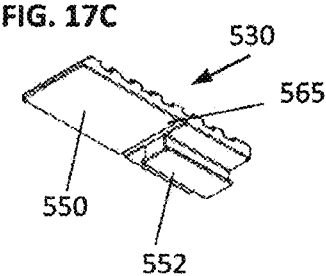
FIG. 17D 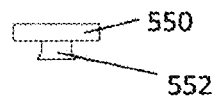  FIG. 17E 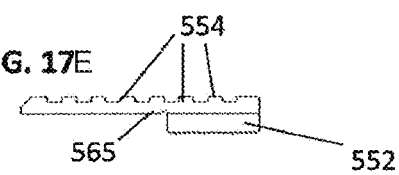

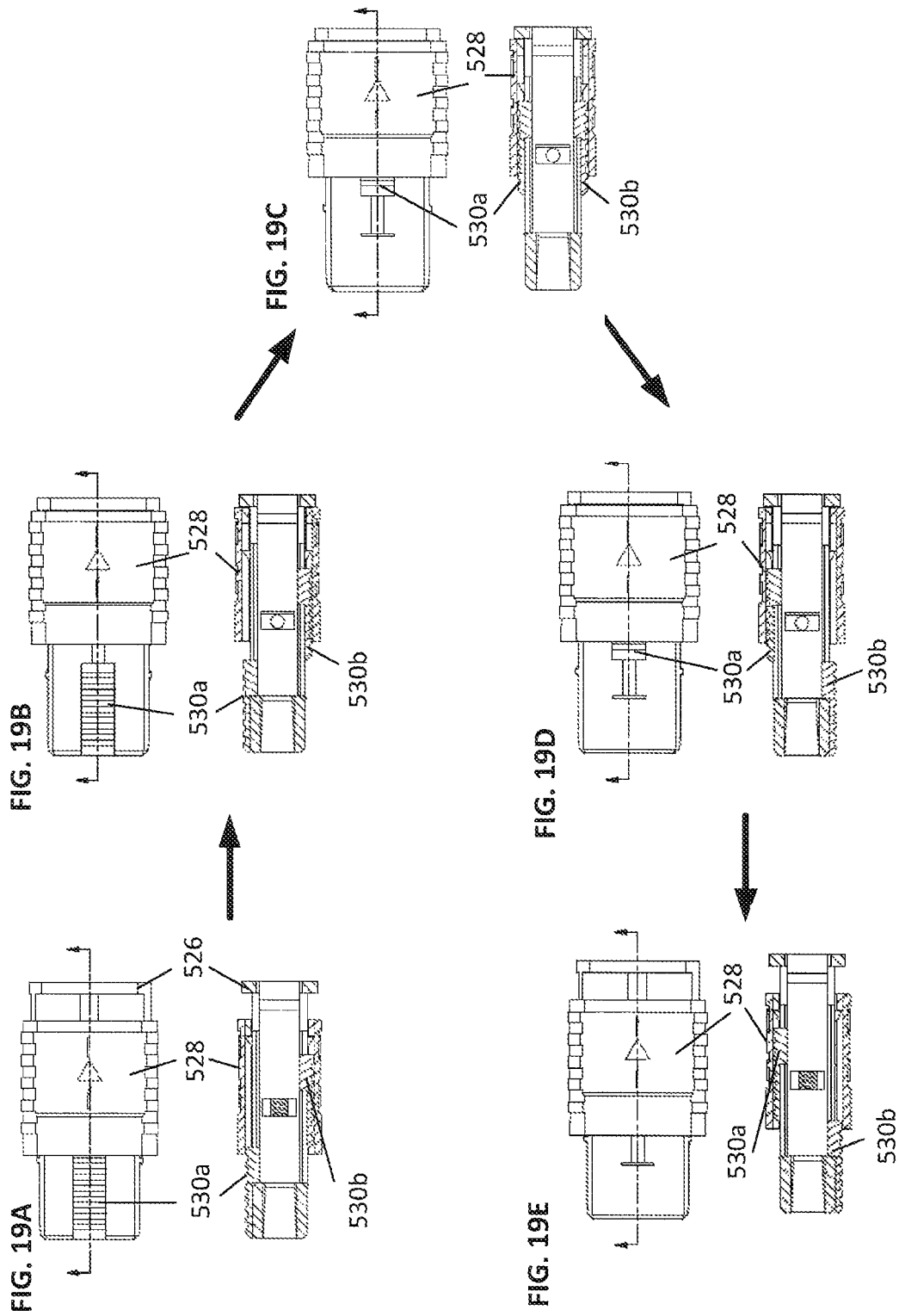

FIG. 27
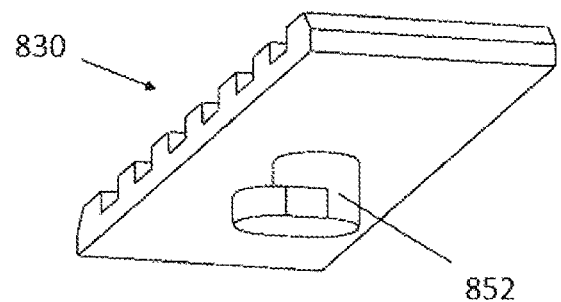
FIG. 28B  FIG. 28A
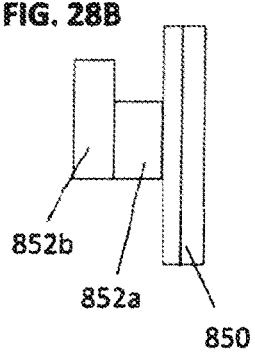 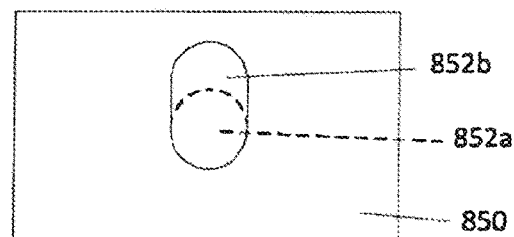
FIG. 28C
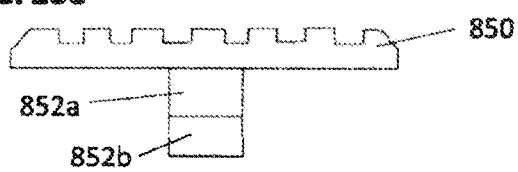
FIG. 29
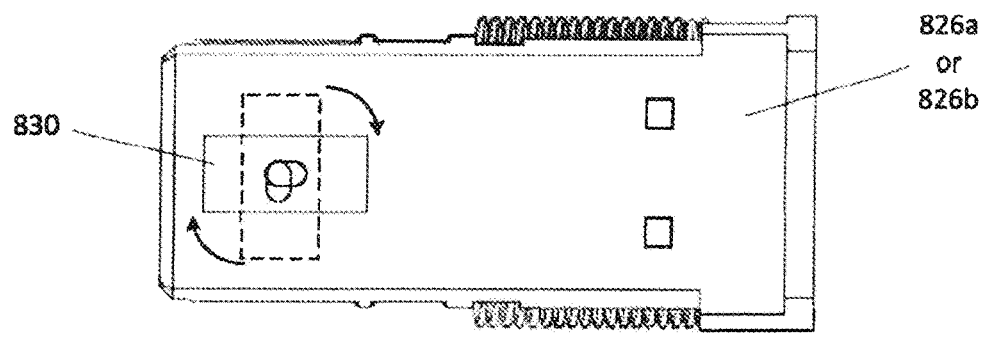

OPTICAL FIBER CONNECTOR WITH CHANGEABLE POLARITY

CROSS REFERENCE TO RELATED APPLICATIONS

This application is a continuation of U.S. patent application Ser. No. 16/707,532 filed on Dec. 9, 2019 which is a continuation of U.S. patent application Ser. No. 15/601,308 filed on May 22, 2017, now U.S. Pat. No. 10,539,750 issued Jan. 21, 2020, which is a continuation of U.S. patent application Ser. No. 14/637,314, filed Mar. 3, 2015, now U.S. Pat. No. 9,658,409 issued on May 23, 2017, and all the contents of the above patent applications are incorporated by reference in their entirety as if fully set forth herein. The title of the patents above is "Optical Fiber With Changeable Polarity".

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using multi-fiber push-on/pull-off (MPO) technology may contain and connect 12 or 24 fibers. Connectors, such as MPO type connectors, generally include a housing portion that contains a ferrule that terminates the ends of the fibers. Ferrules are generally used to retain the ends of the optical fibers for connecting the optical fibers. One type of optical ferrule that may be used with MPO type connectors is an MI (Mechanically Transferable) ferrule.

Typically, MPO connectors are joined together to connect the optical transmission path of one fiber optic cable to another fiber optic cable or device, and the connection may be made by inserting the MPO connectors in an MPO adapter. An adapter generally includes a housing, or portion of a housing, having at least one port which is configured to receive and hold a connector to facilitate the optical connection of the connector ferrule with the ferrule of another connector or other device. Adapters may be used to facilitate connections contained within a chassis. The term "chassis" as used herein broadly refers to a containment structure for housing electrical components or switching components.

As a result of the use of pre-terminated fiber assemblies, the issue of maintaining polarity in parallel fiber-optic links is becoming increasingly important. Described simply, polarity maintains proper continuity between transmitters and receivers. In order to make sure that connectors are mated correctly with an adapter, the connector and adapter typically include fixed keying features that permit the connector to be mated with the adapter in generally only one mating configuration. While this has the advantage of preventing a connection that has the wrong polarity, it also can make it difficult to change the polarity of the connection on site.

Therefore, there remains a need for multi-fiber, fiber optic connectors that have the flexibility of easily changing the polarity of the connector on site.

SUMMARY

So that the polarity of a multi-fiber, fiber optic connector may be changed, a housing of the connector may be configured, to include a removable key that may be positioned at alternate locations on the housing. To change the polarity, the key may be moved from one location to another.

A multi-fiber fiber optic connector includes a ferrule having a plurality of optical fibers supported therein, and a housing disposed around at least a portion of the ferrule. The housing has a first end for being inserted into a fiber optic adapter, a second end disposed opposite the first end, and at least a first wall portion extending from the first end towards the second end and a second wall portion opposite the first wall portion and extending from the first end towards the second end, wherein each of the first wall portion and the second wall portion have an internal surface disposed towards the ferrule and an external surface disposed outwardly away from the ferrule. The housing defines a longitudinal axis in a direction from the first end to the second end, a transverse axis orthogonal to the longitudinal axis, and a vertical centerline through the first and second wall portions. The connector also includes a key configured to be removably attached to either the first wall portion to define a first keyed configuration for insertion of the first end into the adapter in only a first orientation to define a first polarity with respect to the adapter, or the second wall portion to define a second keyed configuration for insertion of the first end into the adapter in only a second orientation to define a second polarity with respect to the adapter, wherein the second polarity is opposite to the first polarity. The key includes a first end configured for engaging with the housing adjacent the first housing end to prevent movement of the first key end with respect to the housing in at least a direction laterally away from the housing when removably attached to either the first wall portion or the second wall portion, and a second end disposed longitudinally away from the first end and configured for being removably attached to the housing at a second location of the housing spaced longitudinally from the first end of the housing towards the second end of the housing to prevent movement of the key with respect to the housing in at least a longitudinal direction along the housing when removably attached to either the first wall portion or the second wall portion.

In an embodiment, a housing for a fiber optic connector includes a first end for being inserted into a fiber optic adapter, and a second end disposed opposite the first end, and the housing defines a longitudinal direction from the first end to the second end, and a transverse direction orthogonal to the longitudinal direction. The housing also includes at least a first wall portion extending from the first end towards the second end and a second wall portion opposite the first wall portion and extending from the first end towards the second end, wherein each of the first wall portion and the second wall portion have an external surface disposed outwardly away from the ferrule. The housing also includes a key configured to be removably attached to either the first wall portion to define a first keyed configuration for insertion of the first end into the adapter in only a first orientation to define a first configuration with respect to the adapter or the second wall portion to define a second keyed configuration for insertion of the first end into the adapter in only a second orientation to define a second configuration with respect to the adapter. The key includes one of a snap-in fastener and a twist lock fastener configured for engaging with either the first wall portion or the second wall portion, and each of the first wall portion and the second wall portion comprises an opening configured for receiving the snap-in fastener or the twist in fastener to releasably retain the key with either the first wall portion or the second wall portion.

In an embodiment, a method is provided for switching the polarity configuration between a multi-fiber fiber optic connector and a corresponding adapter configured for receiving the connector. The connector has a connector housing comprising a first end for being inserted into the adapter, a second end disposed opposite the first end, and at least first and second movably displaceable keys displaceable along the housing between a first position adjacent the first end and a second position disposed towards the second end. One of the first and second keys may be in its first position and the other of the first and second keys may be in its second position to provide a first polarity for the fiber optic connector. The method includes slidingly displacing the first key from its corresponding first or second position to the other of the first and second positions, and slidingly displacing the second key from its corresponding first or second position to the other of the first and second positions, to provide a second opposite polarity for the fiber optic connector.

BRIEF DESCRIPTION OF THE FIGURES

FIGS. 6A-6E are face, side, cross-sectional and detail views of the fiber optic connector housing according to the embodiment of FIGS. 3A and 3B.

FIG. 7 is a perspective view of an alternative key according to an embodiment.

FIG. 8 shows the key of FIG. 7 positioned on a connector housing according to an embodiment.

FIGS. 9A-9C are face, cross-sectional and detailed views of a connector of the embodiment of FIG. 8.

FIGS. 10A and 10B are different perspective views of an alternative key according to embodiment.

FIGS. 11A-11C are various views of a connector with the key of FIGS. 10A and 10B according to an embodiment.

FIGS. 16A-16C show top, side and cross-sectional views of the connector or FIG. 14A, 14B according to an embodiment.

FIGS. 17A-17E are various views of the moveable key of FIGS. 14A, 14B according to an embodiment.

FIGS. 19A-19E show sequential views (top and cross-sectional) of the process of switching the polarity of the connector of FIGS. 14A, 14B according to an embodiment.

FIG. 27 is a perspective view of an 'twist-lock' insertable key according to an embodiment.

FIGS. 28A-28C are bottom, end and side views of the key of FIG. 27 according to an embodiment.

FIG. 29 is a top view of the inner housing of a connector for the key of FIG. 27 according to an embodiment.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

For connection of cables together or with other fiber optic devices, the terminal ends of a cable may include a connector. A connector may include a housing structure configured to interact with and connect with an adapter. An adapter, in a simple form, may include two aligned ports for aligning fiber optic connectors therein to align and connect optical fibers end-to-end. As described herein, the connectors and adapters may be considered multi-fiber connectors and multi-fiber adapters.

Figure 1:
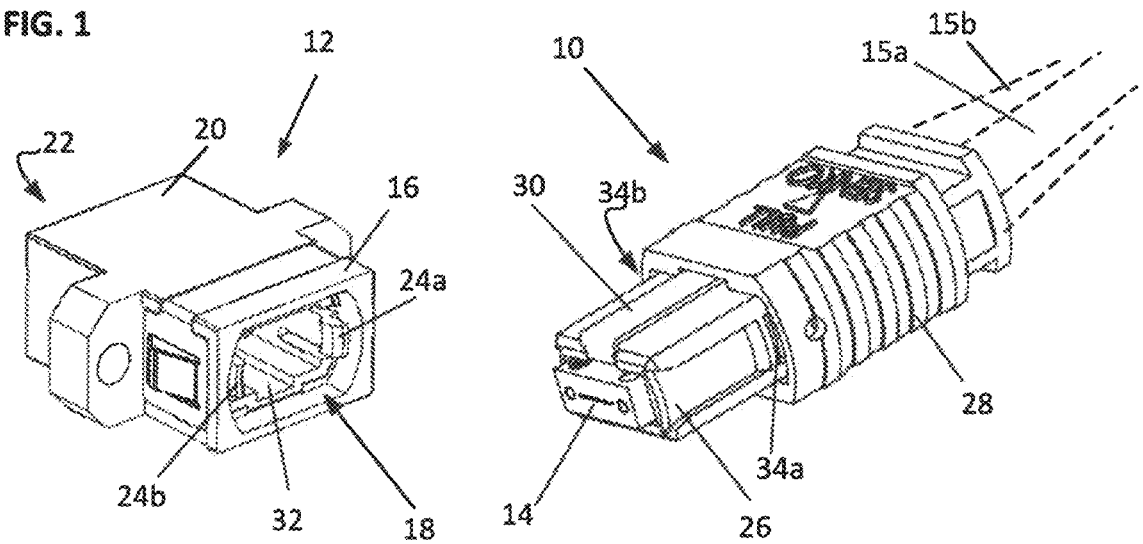
FIG. 1 depicts perspective views of an MPO connector and adapter according to an embodiment.

While the following description is directed towards MPO adapters and MPO connectors with MT optical ferrules, the embodiments described may be applicable to other adapters, connectors and ferrule types as well. An embodiment of an MPO connector 10 and adapter 12 are generally represented in FIG. 1. A first end of the connector 10 may include a ferrule 14 that may be a multi-fiber ferrule as shown. In addition, the connector 10 may have attached thereto, a fiber optic cable 15a and cable boot 15b (shown only schematically) that may extend from a second end of the connector.

An adapter 12 may include a first end 16 having a first plug-in port 18 for receiving the ferrule end of an optical fiber connector 10 therein, and may include a second end 16 having an additional plug-in port 22 (not visible) for receiving an additional MPO optical fiber connector, or other type of fiber optic device therein.

For retention of an MPO connector 10 within each of the ports 18, 22 the ports may be provided internally with a connector clip that may be formed by the two resilient tabs 24a, 24b configured to be displaceable outwardly for insertion and removal of a connector 10 into or out of the ports 18, 22, and return to essentially their original position to engage and retain a connector in the ports. Adapters 12 may be configured to be mounted on a chassis panel, and may include mounting flanges 26a, 26b to mount the adapter via screws, for example.

A connector 10 may include an inner housing 26 that may surround the ferrule 14. In the embodiment depicted, ferrule 14 is of the female type—a pairing connector may have a male-type ferrule with two guide pins that fit into the receiving holes of the female ferrule. A connector 10 may also include an outer housing member 28 that may be slidably disposed about the inner housing 26 adjacent the second end of the connector 10. To provide for a predetermined alignment of the fiber optic cables within the adapter 12, the inner housing may include an alignment key 30 that is configured to fit within keying slot 32 of the adapter. For example, in the embodiment depicted, one of the connector 10 or adapter 12 will need to be rotated about its axis 180° to align the key 30 with the slot 32. Inner housing 26 may slide into port 18 until tabs 24a, 24b engage into slots 34a, 34b of the inner housing. The outer housing 28 may be moved towards the second end to allow the tabs 24a, 24b to engage into slots 34a, 34b, and to retain the tabs in the slots, the outer housing may be slid back towards the first end and over the tabs. The outer housing 28 may be biased towards the first end via springs (shown for example in FIG. 6D) or alternative types of biasing devices.

Figure 2A:
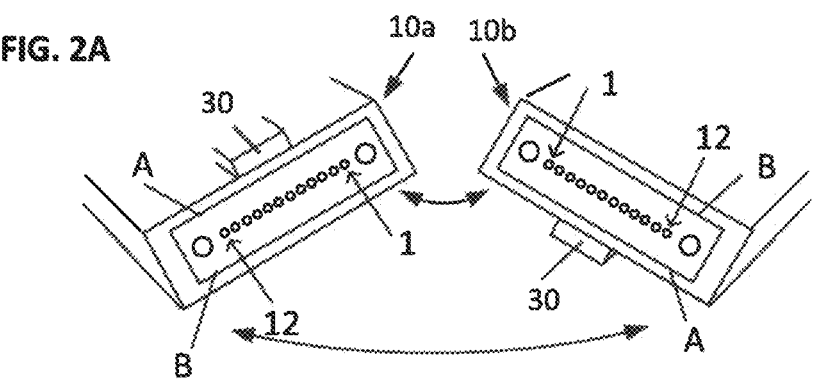
FIGS. 2A and 2B depict mating/polarity configurations of MPO connectors according to an embodiment.
Figure 2B:
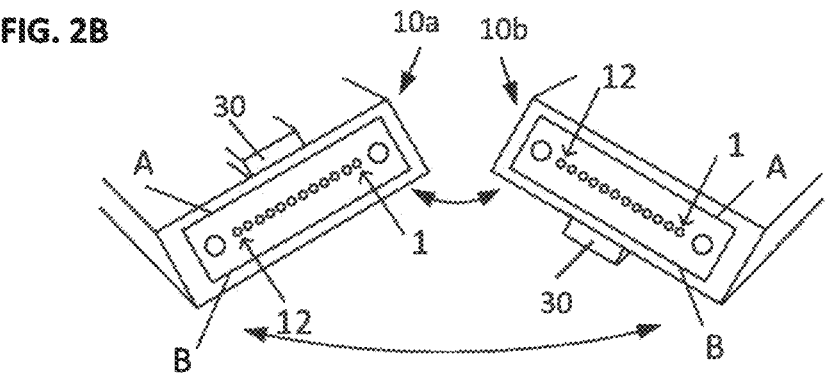

FIGS. 2A and 2B represent the two different modes of connection alignment to provide for the two different modes of polarity. FIG. 2A may be indicated as representing what may be termed a 'normal' polarity wherein fiber No. 1 of the connector 10a may mate with fiber No. 1 of connector 10b, and similarly, fiber No. 12 of the connector 10a may mate with fiber No. 12 of the connector 10b. For this type of alignment, the key 30 may be disposed adjacent side A of the ferrule, and the adapter may be keyed accordingly, with the slots 32 (FIG. 1) in correspondingly opposed surfaces within the adapter 12. To reverse the polarity of the connection between connectors 10a, 10b, as shown in FIG. 2B, the key position of the key 30 of connector 10b would need to be changed to the opposite surface for reversed alignment in an adapter 12, fiber No. 1 of the connector 10a may mate with fiber No. 12 of connector 10b, and similarly, fiber No. 12 of the connector 10a may mate with fiber No. 1 of the connector 10b. Alternatively, the key 30 of the connector 10a could be changed, or in a further embodiment, a different type of adapter may be used, wherein the slots 32 may be aligned on the same internal surface within the adapter 12.

Since an adapter 12 may already be permanently mounted on a surface, and may have a cable plugged into a back side thereof, an embodiment wherein the location of key 30 may be changed would provide for a quick, onsite polarity change. An embodiment of a connector 110 having a detachable key 130 is represented in FIG. 3. For clarity, the ferrule and any cable and cabling components are omitted. The connector may include an inner housing 126 and an outer housing 128. The inner housing may have a top side wall 126a and a bottom side wall 126b that may be disposed opposite one another, or rotationally, 180° from one another about a central longitudinal axis 140. The designation top and bottom are used for reference only as per the orientation shown, and could alternatively be interchanged. In an embodiment, each of the side walls 126a and 126b may be similar, or essentially the same, and each side wall may include a corresponding slot 132a and 132b that is configured for receiving the key 130. At least a portion of the key 130 may be configured to be removably insertable into either of the slots 132a and 132b. The key 130 may be configured in conjunction with the walls 126a and 126b to be removably attached with either the top wall 126a or the bottom wall 126b. In an embodiment, when key 130 is disposed with the top wall 126a, the connector 110 may be configured to define a first keyed configuration for insertion of the first end of the connector into an adapter in only a first orientation to define a first polarity with respect to the adapter. Alternatively, when key 130 is disposed with the bottom wall 126b, the connector 110 may be configured to define a second keyed configuration for insertion of the first end into the adapter in only a second orientation to define a second polarity with respect to the adapter. As discussed previously, the second polarity may be considered to be opposite to the first polarity.

Figure 3A:
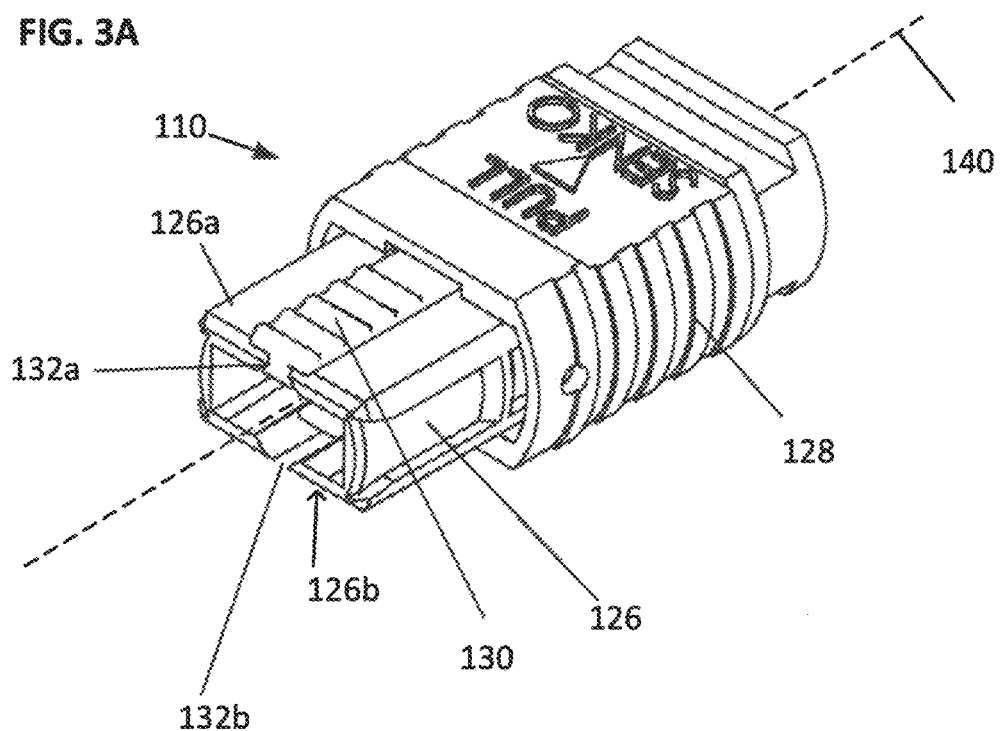
FIGS. 3A and 3B are representative top and bottom perspective views of a fiber optic connector housing with a detachable key for changing the polarity of the connector according to an embodiment.
Figure 3B:
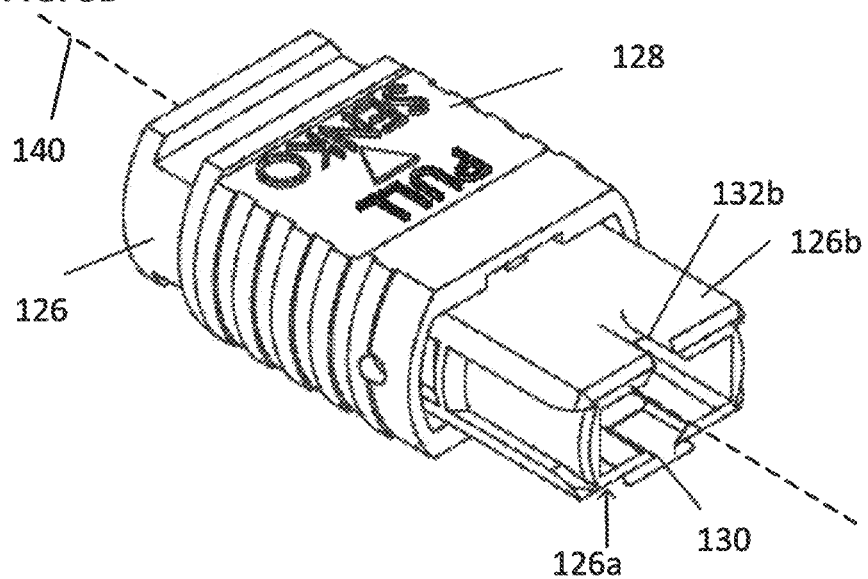
Figure 4:
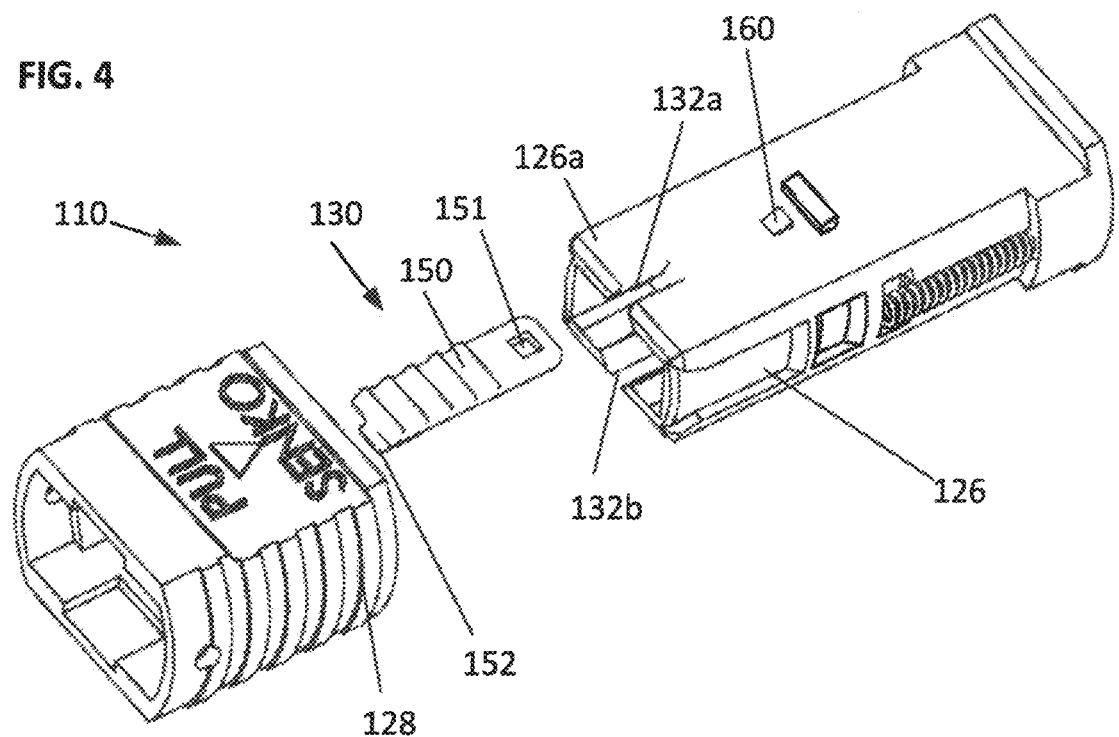
FIG. 4 is a perspective view of a partially disassembled fiber optic connector housing according to the embodiment of FIGS. 3A and 3B.
Figure 5A:
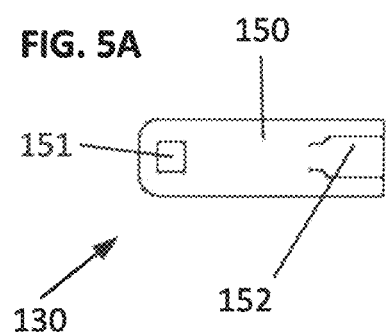
FIGS. 5A-5D are bottom, top, end and side views of a key according to the embodiment of FIGS. 3A and 3B.
Figure 5B:
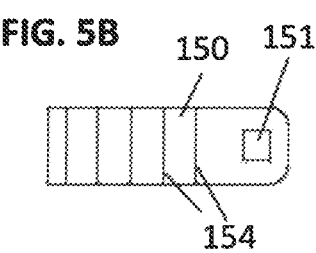
Figure 5C:
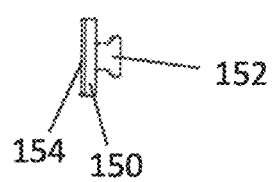
Figure 5D:
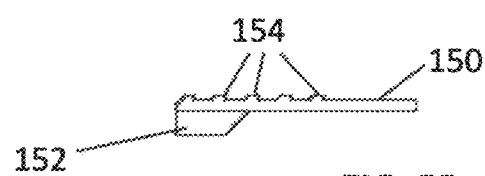
Figure 12A:
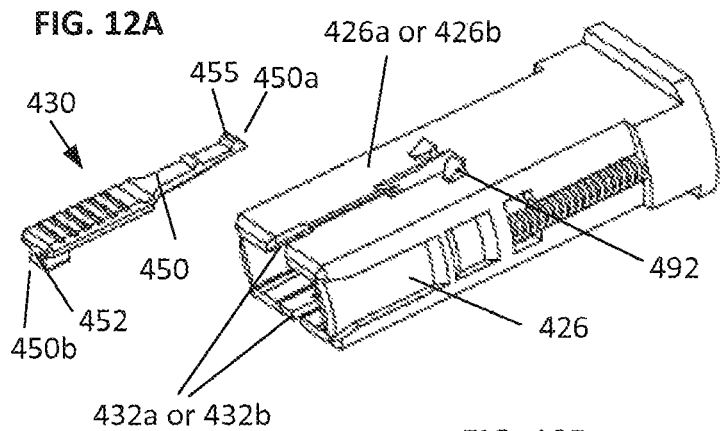
FIGS. 12A and 12B are different perspective views of an alternative key according to an embodiment.
Figure 12B:
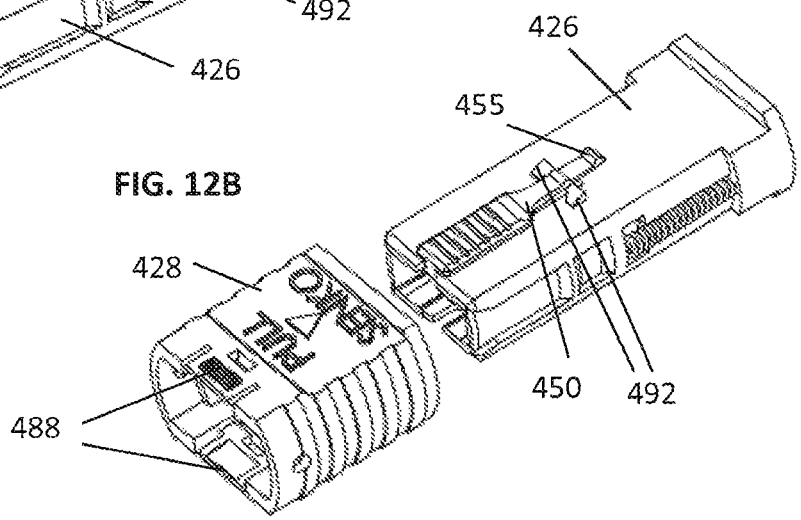
Figure 13A:
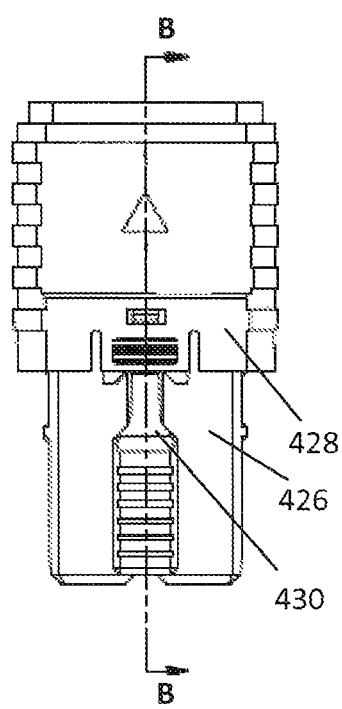
FIGS. 13A-13C are various views of a connector with the key of FIGS. 12A and 12B according to an embodiment.
Figure 13B:
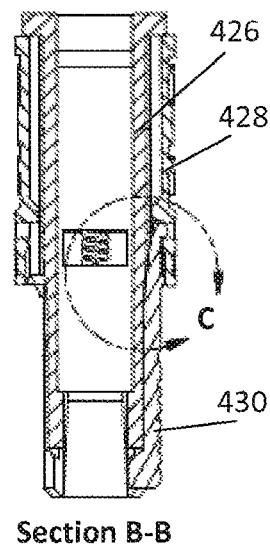
Figure 13C:
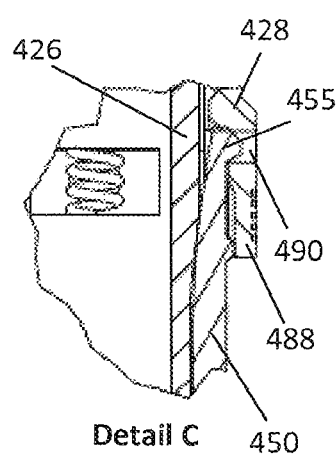
Figure 14A:
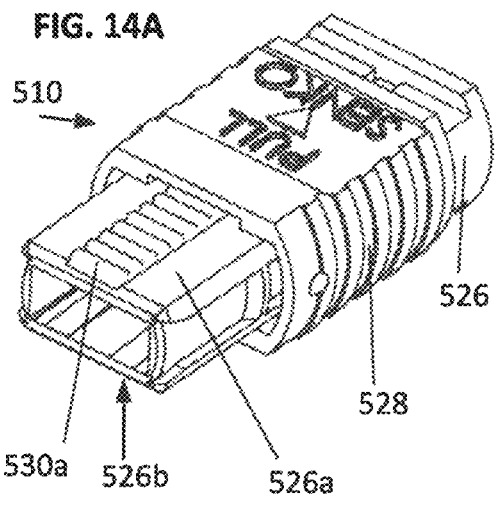
FIGS. 14A and 14B are perspective views of a connector with movable keys according to an embodiment.
Figure 14B:
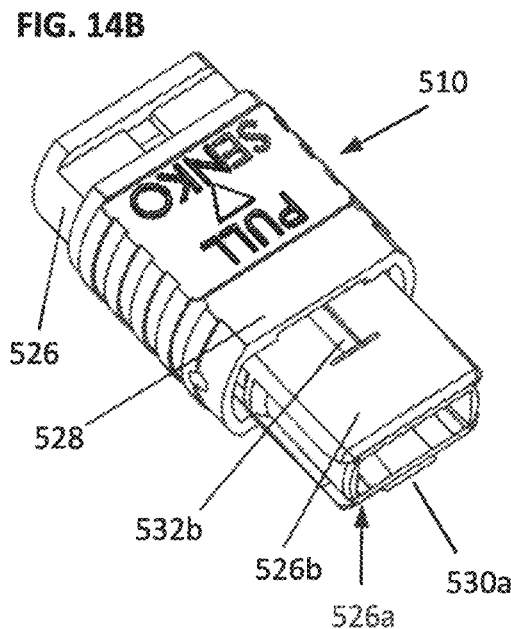
Figure 15A:
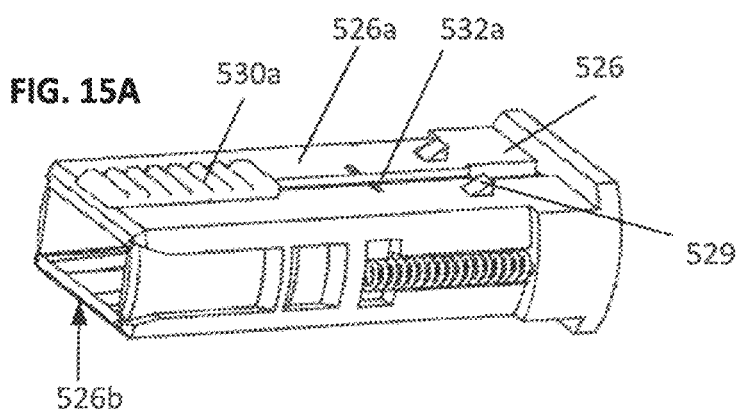
FIGS. 15A and 15B are views of components of the connector of FIGS. 14A, 14B with the outer housing removed according to an embodiment.
Figure 15B:
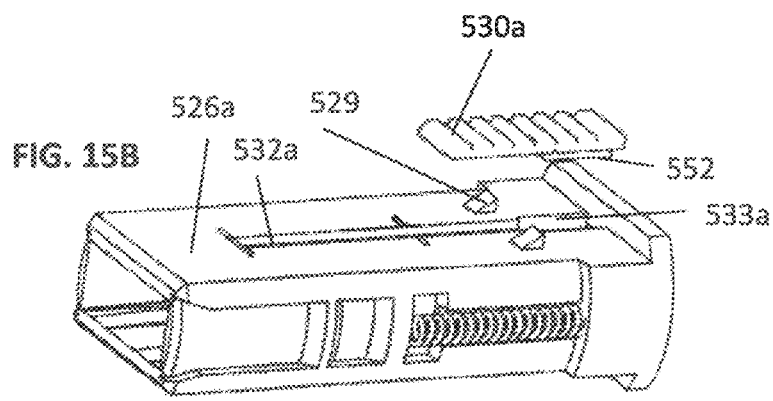

FIG. 4 shows a partially disassembled view of the connector 110 of FIGS. 3A and 3B. In an embodiment, as shown in greater detail in FIGS. 5A-5D, the key 130 may include a body portion 150 that may include a slot or hole 151 at a first end of the key, and a guide rail 152 at a second end of the key. The guide rail 152 may be configured to fit within either of the slots 132a, 132b to guide longitudinal movement of the key 130 into a slot, and also prevent side-to-side (lateral) movement of the key once inserted in the slot. The guide rail 152 and slots 132a, 132b may also be configured with respect to one another to prevent the key from moving out of the slot in a direction transverse to the longitudinal axis. In an embodiment, the width of the slots 132a, 132b may widen in a direction from the external surfaces of the housing to the internal surface. The guide rail 152 may be correspondingly configured, as shown in FIG. 5C to have a narrower width adjacent the body 150 and widen in a direction extending away from the base. With such a configuration the key 130 may essentially be prevented from being lifted upwardly away from the housing 126 once inserted in a slot 132a or 132b, while also being prevented from moving laterally on the housing.

To engage the key 130 longitudinally with respect to the housing 126, the housing may include a projection 160 over which the key body 150 may be inserted to engage the projection within the hole 151. The projection 160 may be tapered outwardly away from the housing in at least the insertion direction to facilitate movement of the key body 150 up and over the projection, To facilitate removal of a key 130, once engaged with the projection 160, the key body may include at least one gripping ridge 154, or alternatively a plurality of ridges (as shown) disposed along the body 150. The ridges may be configured to be engaged, for example with a fingernail, to pull the key from the housing 126.

Additional details of the connector housing 110 may be seen in the views represented by FIGS. 6A-6F. FIGS. 6A and 6B show representative face and side views of the connector 110 with the key 130 installed. FIG. 6C is a cross-sectional view along line C-C in FIG. 6A, and FIG. 6D is a cross-sectional view along line D-D in FIG. 6B. As mentioned previously with regard to FIG. 1, the outer housing 128 may be slidably disposed about the inner housing 126 and a spring 170 may be provided to bias the outer housing forwardly, or towards the first, or insertion end of the inner housing as represented in FIG. 6D. Tabs 129, as shown in detail in FIG. 6E, may be configured to limit forward movement of the outer housing 128 along the inner housing 126.

The outer housing 128 may be moved rearwardly on the inner housing by a distance dl. Movement of the outer housing over the distance dl provides access to the slots 134 for engagement into the slots of adaptor tabs (such as tabs 24a, 24b in FIG. 1) for engagement of the connector 110 within an adapter. Similarly, the outer housing 128 may be displaced by the distance dl to release the adapter tabs for removal of the connector 110 from the adapter. FIG. 6E shows a detailed view of the interconnection between the key body 150 and hole 151 with the projection 160 of the inner housing 126. As shown in FIG. 6E, the second end of the body 150 may fit between the inner housing 126 and outer housing 128. As such, in an embodiment, the outer housing 128 may be displaced by the distance dl to provide clearance for the key to be inserted onto the inner housing 126. When the outer housing 128 is biased forwardly as shown, the key body 150 may be prevented from being released from the projection 160. To remove the key 130, the outer housing 128 may be slid rearwardly by the distance dl to provide clearance for lifting of the key body 150 outwardly away from around the projection 160 as shown in FIG. 6F.

An alternative embodiment of a removable key 230 is depicted in FIG. 7. In the embodiment of FIG. 7, the guide rail 252 may essentially be similar to the guide rail 152 as discussed above. Alternatively, the guide rail 152 may have an alternative configuration. The gripping surface may include at least one groove 254 that may function in essentially the same manner as the ridges 154 as discussed above, that is, to provide a surface that may be readily engaged to slide the key 230 from the inner housing 226. In an embodiment, the key 230 may have a solid key body 250 at the first end 231, or alternatively, as shown, may include an elongated slot 251 that may provide various functions as set forth further herebelow.

In an embodiment as represented in FIGS. 7 and 8, the configuration for releasably retaining the key 230 with the inner housing 226 may include lateral tabs 256a, 256b at the first, or insertion end 231 of the key body 250. The lateral tabs 256a, 256b may be configured to define corresponding lateral recesses 258a, 258b. The top or bottom surface 226, in addition to having slots for receiving the guide rail 252 (not shown, but essentially similar to slots 132a, 132b in FIG. 4), may include projections 272a, 272b configured to straddle the key body 250 wherein the width between the projections may be substantially the same as the width of the key body between the lateral recesses 258a, 258b.

The key 230 may be engaged with the inner housing 226 by insertion of the first key end 231 between the projections 272a, 272b. By including a slot 251 between the lateral tabs 256a, 256b at the first end 231, the tabs may more easily be deflected inwardly to allow for the tabs to pass between the projections 272a, 272b. Alternatively, if a slot 251 is not included, some polymeric materials of which the key may be constructed, may be resilient sufficiently to allow for inward compression of the tabs 256a, 256b to permit the tabs to move past the projections 272a, 272b. Once past the projections 272a, 272b, the tabs 256a, 256b may again push outwardly and retain the key 230 in engagement with the inner housing 226, at least in the longitudinal direction of insertion of the key.

The thickness of the body 250 at the first end 231 may essentially be the same as the space defined between the inner housing 226 and an outer housing 228 (FIGS. 9A-9C) so that the key 230 cannot be lifted away from the inner housing when the outer housing is in place, ensuring that removal of the key 230 must be done by longitudinal displacement of the key from between the projections 272a, 272b.

FIGS. 9A-9C show an alternative embodiment of an outer housing 228. In conjunction with the key 230 having a slot 251, the inside of the outer housing may include a guide 275 that is configured to fit within the elongated slot for movement within the slot upon movement of the outer housing longitudinally along the inner housing 226. In an embodiment, the guide 275 could also provide an additional stop for hindering longitudinal withdrawal of the key 230 from between the inner housing 226 and outer housing 228. When the outer housing 228 is in its forward biased position as shown, the thickness of the key body 250 may be essentially the same as the distance between the inner and outer housings. As such, upon an initial movement of the key 230 in a longitudinally downward in the figure, the slot 251 would move along the guide 275 until the inner surface 231a of the first end 231 would contact the guide, thereby hindering further outward movement of the key.

So that the first end 231 of the key 230 may pass into the space between the inner housing 226 and outer housing 228, the inner housing may include a recess 276 that has a depth into the housing that is sufficient to permit the first end to pass between the guide 275 and the inner housing. In an embodiment as represented in FIGS. 9B and 9C, the deepest part of the recess 276 may be located at a position along the inner housing 226 that corresponds to a location at which the guide 275 might be located upon displacement of the outer housing 228 towards the back end of the inner housing. As such, when the outer housing 228 is biased forward into its normal use position, the key 230 will not pass between the guide 275 and the inner body 226. The key 230 may only pass when the outer housing 228 is first displaced towards the back end of the inner housing 226.

In the various embodiments disclosed herein, the keys and housing components, may be formed of rigid polymers or metals, for example. In general, any type of substantially rigid material may be used. The material should have a rigidity sufficient to retain the necessary engagement between the key and the housing so that the key remains in place except when a force is applied to remove the key.

Another embodiment of a key 330 is shown in FIGS. 10A and 10B. The key 330 may, for example, be a formed metal band or rigid polymer. The key 330 may include a longitudinal body 350 having a first end 350a and a second end 350b. A connector 310 in conjunction with a key 330 is represented in FIGS. 11A-11C. At the front end 327, each of the sidewalls 326a and 326b may include a recess or notch 280 that is configured to receive the second end of the key 330 therein. The second end 350b may be hooked, or U-shaped to provide a bent flange 352 configured to fit around the front end 327 of the inner housing 326. Such a configuration of a hook and notch may prevent lateral movement of the key 330 on the sidewalls 326a and 326b, and may prevent movement transversely away from the housing, or a lifting off from the housing via the second end.

The first end 350a of the key 330 may include a tab 353 that extends substantially orthogonally from the body 350.

As represented in FIGS. 11B and 11C, the inner housing may have a recess, slot or hole 382 configured for receiving the tab 353 therein. Once tab 353 is engaged within the slot 382, longitudinal movement of the key 330 may be inhibited. As shown in FIG. 11A, outer housing 328 may prevent the first end 350a of the key 330 from being lifted away from the inner housing 326, so that when the outer housing is biased into its forward position, the key 330 is essentially locked in place on the housing.

Outer housing 328 may be displaced rearwardly for installation and removal of the key 330. For installation, the outer housing 328 may be displaced rearwardly against the bias of springs (not shown, but discussed previously). The flange 352 may be aligned with the notch 380 and the key may be slid longitudinally into place with the flange in the notch to align the tab 353 with the slot 382. Tab 353 may be pushed into the slot 382 and the outer housing 328 may be released to move forwardly to cover the first end 350a of the key 330 and hold the key in place. This procedure may be reversed for removal of the key 330. Outer housing 328 may be displaced rearwardly, tab 353 may be lifted out of the slot 382, and the key may be slid longitudinally off of the inner housing 326.

In an alternative embodiment, as represented in FIGS. 12A, 12B and 13A-13C, a key 430 may be configured to releasably connect with the outer housing 428. The key 430 may include a longitudinal body portion 450 and a guide rail 452 on the second end 450b. The guide rail 452 may be configured to engage in a slot 432a, 432b of the inner housing 426 in a manner as described earlier with regard to FIGS. 6A-6E. In an embodiment, instead of a hole at the insertion end, the body 450 may include a projection 455 that extends away from the body. To engage with the projection 455, as shown in detail in FIG. 13C, the outer housing 428 may include a receptacle 490 into which the projection may extend when the outer housing is in place around the inner housing 426.

Similar to earlier embodiments, the second end 450b of the key 430 may be retained in the slots 432a, 432b in the lateral and transverse directions by the configuration of the guide rail 452. The second end 450b may essentially be movable in only the longitudinal direction upon insertion or removal of the key 430. When inserted, the first end 450a of the key 430 may be held in place from lateral movement by a pair of projections 492 extending from the inner housing and defining a space therebetween that is essentially the same as the width of the body portion 450. The outer housing 428 may include depressible tabs 488 that, when pressed down, press downwardly on the first end 450a to release the projection 455 from engagement in the receptacle 490.

In an alternative embodiment, as shown in FIGS. 14A, 14B, 15A, 15B, 16A, 16B and 16C, instead of a single key that may be alternatively placed in conjunction with each face of the top or bottom sidewalls of the connector, a connector 510 may be configured so that each sidewall 526a, 526b includes a corresponding displaceable key 530a, 530b. Similar to previous embodiments, the connector 510 may include an inner housing 526 with a longitudinally displaceable outer housing 528 disposed about the inner housing. Each sidewall 526a, 526b may include a longitudinal slot 532a, 532b that extends forwardly from the rear end of the inner housing 526, and as discussed further below, the keys are movably disposable along the lengths of the slots. Depending on the desired polarity, one of the keys 530a or 530b may be positioned forwardly in the slots 532a, 532b, while the other is positioned out of the way, or hidden under the outer housing. In an embodiment, the width of the slots 532a, 532b may widen in a direction from the external surfaces of the housing to the internal surface.

As shown in FIGS. 17A-17E, each key 530 may include a key body 550 and a projecting guide rail 552, similar to the key 130 as previously discussed with reference to FIGS. 5A-5D. Projecting rails 552 may have a narrower width adjacent the body 550 and either widen in a direction extending away from the body, or have a base portion disposed away from the body that has a width greater than the width adjacent the body. Slots 532a, 532b may include an enlarged entry port 533a, 533b that has a width sufficient to allow for passage of the guide rail 552 therethrough. FIG. 16B shows the key 530a disposed over the slot 532a with the guide rail 552 over the entry port 533a, and the key 530b disposed within the slot 532b. Once inserted through the entry ports, the keys 530a, 530b may be displaceable longitudinally along the slots 532a, 532b, and once moved forwardly from the entry ports may not be lifted out of the slots in a direction transverse to the longitudinal direction of the slots due to the configuration of the guide rail with the greater width disposed away from the body.

FIGS. 18A-18D depict the inner housing 526 and outer housing 528. In an embodiment, the inner housing 526 may include stops 529 configured to limit the forward movement of the outer housing 528 under bias of the springs 570. The outer housing may have a front end 528a for being disposed towards the front end of the inner housing 526 when disposed on the inner housing, and a rear end 528b disposed opposite the front end. The outer housing 528 may include internal stops 561, that may be disposed adjacent the rear end 528b, and configured for engaging with the stops 529 of the inner housing 526. A forward facing surface of the stops 529 may be sloped angularly upwards towards the rear of the inner housing so that the outer housing can be forced over the stops when the outer housing is slid onto the inner housing from the front end of the inner housing.

FIGS. 19A-19E represent the operation of the displaceable keys 530a, 530b in relation to the displaceable outer housing 528 and inner housing 526. FIG. 19A represents a connector configured with a first polarity with key 530a in a forward 'active' position and key 530b in a hidden 'inactive' position. To change the polarity, the outer housing 528 may be displaced rearwardly on the inner housing 526 as shown in FIG. 19B. After displacing the outer housing 528, key 530 will be partially exposed. Key 530a may be slid rearwardly out of its 'active' position into its 'inactive' position and, as shown in FIG. 19C, both keys may be in their 'inactive' position. Key 530b may be slid forwardly out of its 'inactive' hidden position into its 'active' position as shown in FIG. 19D, and the outer housing 528 may be released to return to its forward position as represented in FIG. 19E.

Figure 20B:
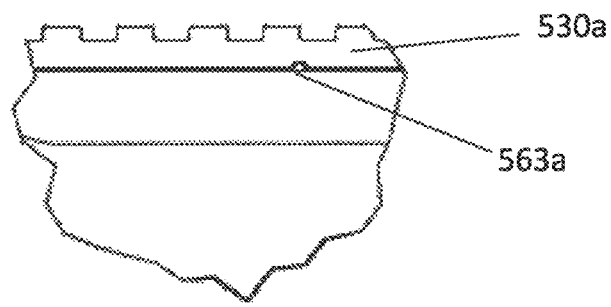
FIGS. 20A-20C show side and detailed views of the connector of FIGS. 14A, 14B according to an embodiment.
Figure 20A:
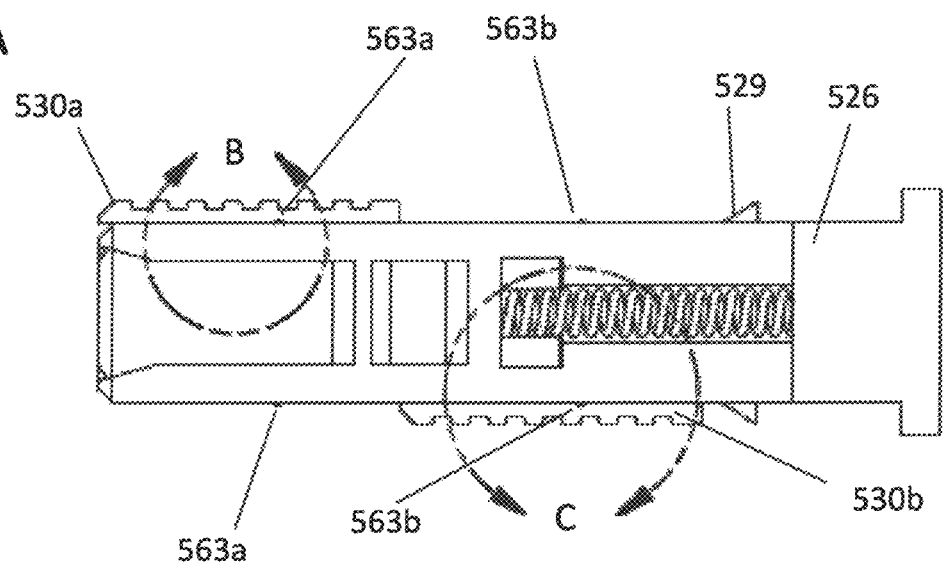
Figure 20C:
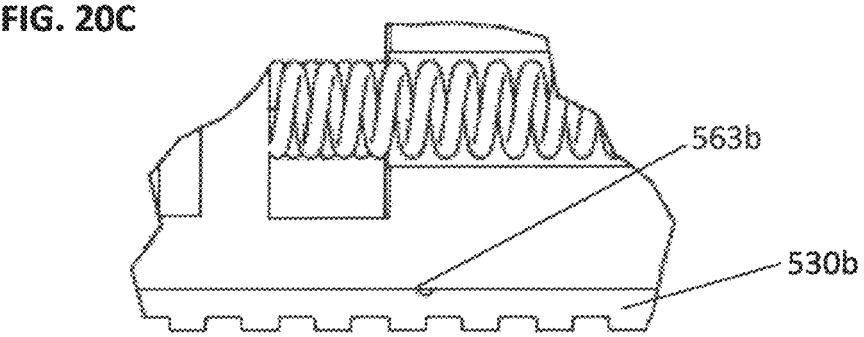

While the above-described sequence represents one mode of switching the polarities, the sequence of movements may be altered. For example, key 530b may be moved forwardly prior to moving key 530a rearwardly. To hold the keys 530a, 530b in the forward, or rearward position, the outer housing and/or keys may include a stop/retention configuration. In an embodiment as represented in FIGS. 20A-20C, (see also FIG. 18A) the exterior surfaces of walls 526a, 526b may include a ridge 563a positioned corresponding to the forward position of a key, and a ridge 563b positioned corresponding to a rearward position of a key. The keys 530a, 530b, as represented in FIGS. 17A-17E may include a corresponding slot 565 (FIGS. 17B, 17C, 17E) for engaging with either of the ridges 563a or 563b depending on the location of the key. Each key 530*a*, 530*b* may therefore be moveable longitudinally over the ridges and when the slots engage with a ridge, the frictional engagement between the keys and the housing will increase and a person working with the connector will be able to feel when engagement occurs. Once engaged, an additional amount of force would then be needed to move the keys from their engaged positions. Alternative configurations of engagement features may also be provided. As an example, as previously discussed with reference to FIGS. 7 and 8, lateral projections and recesses, similar to projections 256*a* and recesses 258*a* may be provided on the sides of a key 530*a*, 530*b* and the housing surface could include a projection such as projections 272*a*, so that a similar engagement as previously described may be provided for positioning of the keys on the inner housing. Alternatively, the features could be reversed wherein the housing may include slots and the keys may include corresponding ridges.

Figure 21A:
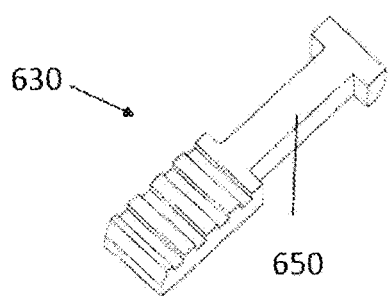
FIGS. 21A-21C are views of an alternative movable key according to an embodiment.
Figure 21B:
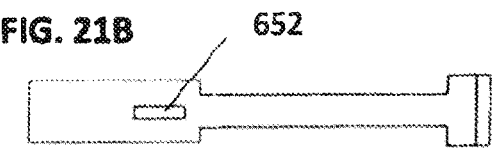
Figure 21C:
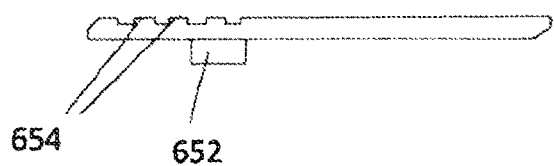
Figure 22:
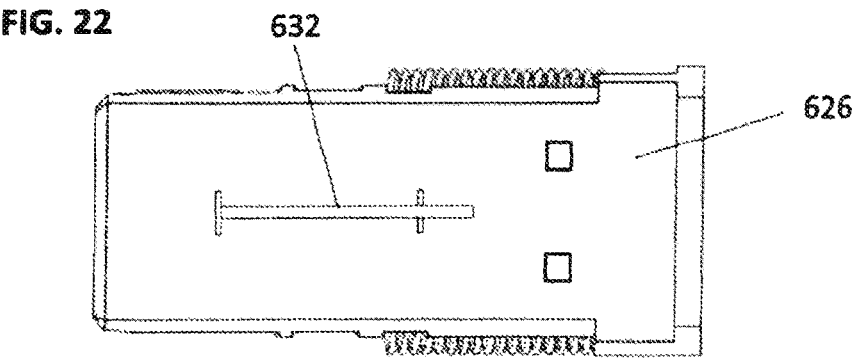
FIG. 22 provides a top view of an inner housing for the key of FIGS. 21A-21C according to an embodiment.
Figure 23A:
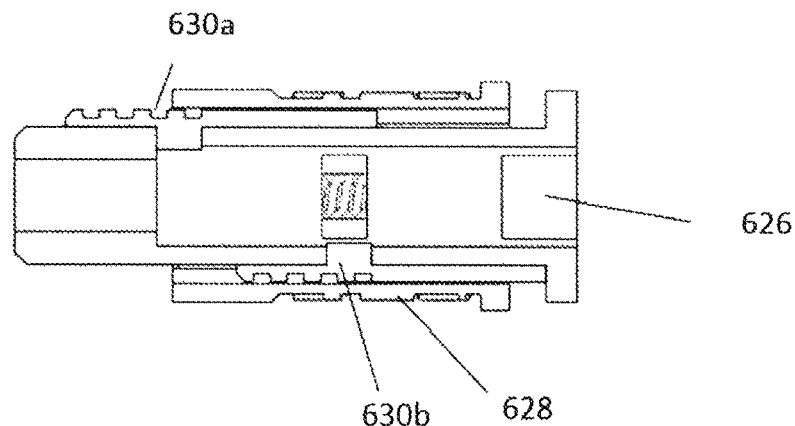
FIGS. 23A-23C show cross-sectional views of a connector assembly with the keys of FIGS. 21A-21C according to an embodiment.

In a variation of the displaceable key, a key 630 could be configured as depicted in FIG. 21. In an embodiment, the key 630 may have a longer body 650 so that more than half of the length of the body, for example about ⅗ to about ⅔ of the key body, will be covered by the outer housing 628, as depicted in FIG. 23A, when the outer housing is in its rest, or forward position, With this type of configuration, the guide rail 652 may be configured as a 'fin-like' projection extending from the body 650. As depicted in FIG. 22, a longitudinal slot 632 on the inner housing 626 may be configured for receipt of the rail 652 therein. Similar to the previously described embodiments, each of the top and bottom surfaces of the inner housing 626 may essentially be identical.

Since at least, for example, about ⅗ of the length of the key 630 may be disposed between the inner housing and the outer housing, the outer housing will essentially prevent lateral movement of the key away from the inner housing 626 when the outer housing is in its forward position as represented, for example by key 630*a* in FIG. 23A in its forward, or 'active' position. In this position of the outer housing 628, the key 630*b* will essentially be hidden in its rearward, or 'inactive' position. The guide rail 652 may therefore not require any widening at its end away from the body as was previously described for guide rail 552.

Figure 23B:
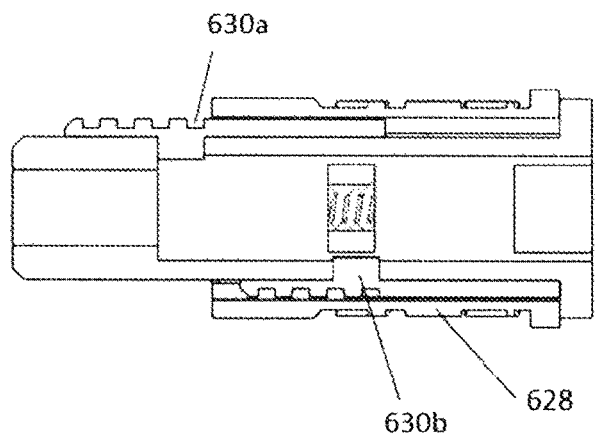
Figure 23C:
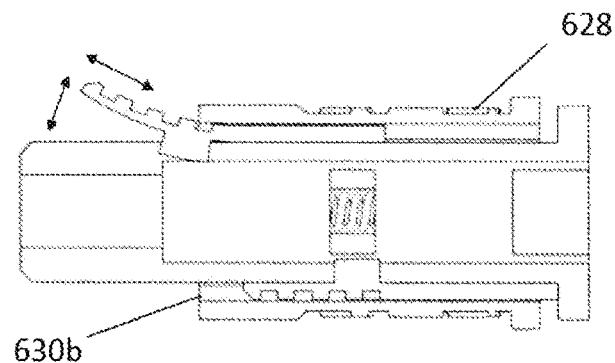
Figure 24:
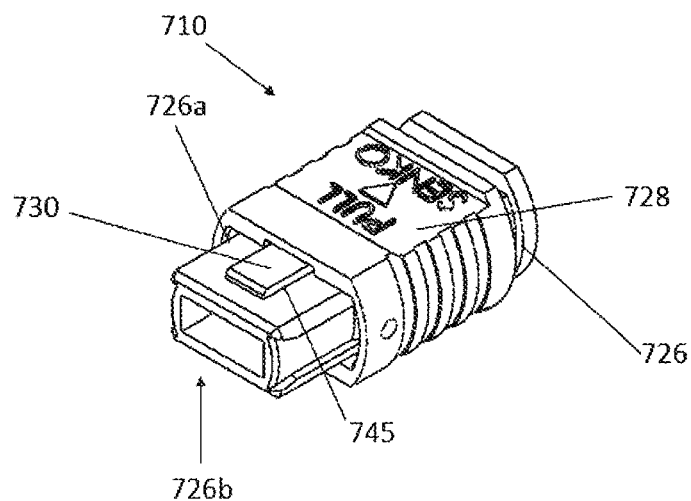
FIG. 24 is a perspective view of a connector having a 'snap-in' key according to an embodiment.
Figure 25:
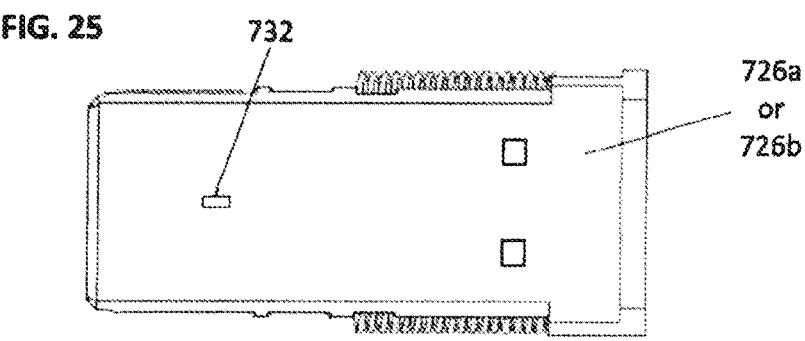
FIG. 25 is a top view of the inner housing of the connector of FIG. 24 according to an embodiment.

As in previous embodiments, the outer housing 628 may be displaceable rearwardly to a position as represented in FIG. 23B. In this embodiment, for example, only ⅓ to ⅔ of the 'active' key may then be covered by the outer housing. In this position of the outer housing 628 the 'inactive' key 630*b* may be exposed for engaging the key to pull the key forward, if desired. The 'active' key 630*a* may by pushed rearwardly into its 'inactive' position, and by changing the position of both keys, the polarity of the connector may be changed. Alternatively, as represented in FIG. 23C, when the outer housing 628 is in its rearward position, the keys 630*a* and/or 630*b* may be removed front the connector or inserted into position on the connector, as a flexibility of the material of the key may provide sufficient clearance for the fin 652 to be lifted out of its corresponding slot 632, so that a key may be pulled form or inserted into the connector.

In a further embodiment, as represented in FIGS. 24-26C, a connector 710 may include a snap-in key 730. Each of top or bottom walls 726*a* or 726*b* of the inner housing 726 may essentially be identical and include a slot 732 for receiving a snap-in projection of the key 730. The key 730 may include a key body portion 750 and a projecting engagement member 752 that is configured to fit into the slot 732 and retain the key 730 in engagement with the inner body 726.

The engagement member 752 may be configured as a 'snap-in' type connector, wherein the engagement member may compress to fit through the slot 732 and then expand to retain member within the slot. In general, any type of 'snap-in' configuration may be usable.

Figure 26A:
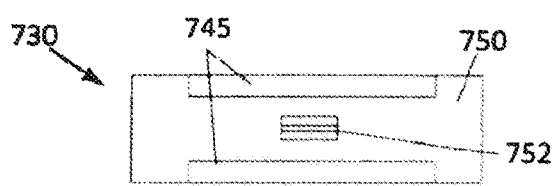
FIGS. 26A-26D show bottom, side, end and detailed views of a snap-in key according to an embodiment.
Figure 26C:
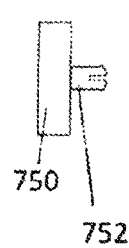
Figure 26D:
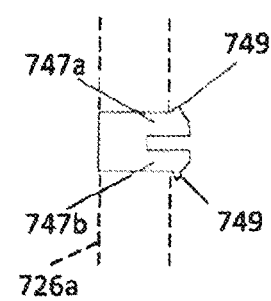
Figure 26B:
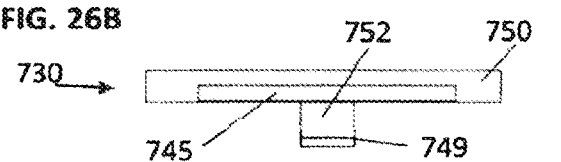

In an embodiment as shown, the engagement member 752 may include first and second leg portions 747*a* and 747*b* separated by a slot that allows for the leg portions to be resiliently displaced towards one another for passage into and through the slot 732. Once through the slot 732 the leg portions 747*a*, 747*b* may return to their natural position. One or both of the leg portions 747*a*, 747*b* may include a catch 749 that projects outwardly from the leg portions to give the engagement member a width which is greater than a width of the slot 732. As represented in FIG. 26D, with an inner housing wall depicted in outline, when the leg portions 747*a*, 747*b* pass through the slot 732 in the inner housing wall and return to their normal positions, the catches can engage the inside surface of the housing wall to thereby provide a retention force against removing the key 730 from the inner housing 726.

The key body 750 may include recessed notches 745 along the longitudinal sides thereof to facilitate removal of the key 730 from the slot 732. The notches 745 may be configured to provide space for insertion of a tool, such as a small screwdriver, or even a fingernail, under the body 750 to apply a lifting force and pry the key 730 upwardly away from the inner housing 726. To prevent rotation of a key 730 on the inner housing 726, the engagement member 752 and slot 732 may have a length dimension (in a longitudinal direction of the key, or housing) that is at least twice as long as a width dimension transverse to the length dimension.

As an alternative to the 'snap-in' configuration, as represented in FIGS. 27 and 28A-28C, a key 830 may be configured with a twist-lock connector 852. The key 830 may include a connector 852 that extends away from the bottom surface of a body portion 850 of the key. The connector 852 may include a shaft portion 852*a* that extends from the body portion 850 and an arm portion 852*b* that extends away from the shaft portion. In an embodiment, the arm portion 852*b* may extend from the shaft portion 852*a* to only one side of the shaft as shown. Alternatively, the arm portion 852*b* and shaft portion 852*a* may be configured with a "T" configuration and the arm portion may extend bilaterally away from the shaft portion in opposite directions (not shown). The top and bottom walls 826*a* and 826*b* may include a corresponding passage 831 having a size and shape configured for passage of the arm portion 826*b* therethrough. The shaft portion 852*a* may have length extending from the body portion 850 so that the length may be substantially the same as the thickness of a wall portion of the top and bottom walls 826*a* and 826*b* at least in the vicinity of the passage 831. The arm portion 852*b*, may thereby engage with an inner surface of the top or bottom walls 826*a* and 826*b* after being inserted through the passage 8311 and then rotated about the shaft 852*a* as represented in FIG. 29.

As shown in FIG. 29, the key 830 may be attached to either of the top or bottom walls 826*a* and 826*b* by aligning the key as represented by the dashed key outline (longitudinal axis of the key transverse to the longitudinal axis of the connector), inserting the arm portion 826*b* through the opening 831 and rotating the key by about 90° to the 'locked-in' key position as represented by the solid key outline (longitudinal axis of the key aligned with the longitudinal axis of the connector). Once rotated, the arm portion 826*b* as indicated by the dotted outline will no longer be aligned with the passage 831 and will be engaged with an interior surface of the top or bottom surfaces 826a and 826b to thereby prevent a lifting or removal of the key 830 away from the top or bottom walls.

Figure 30A:
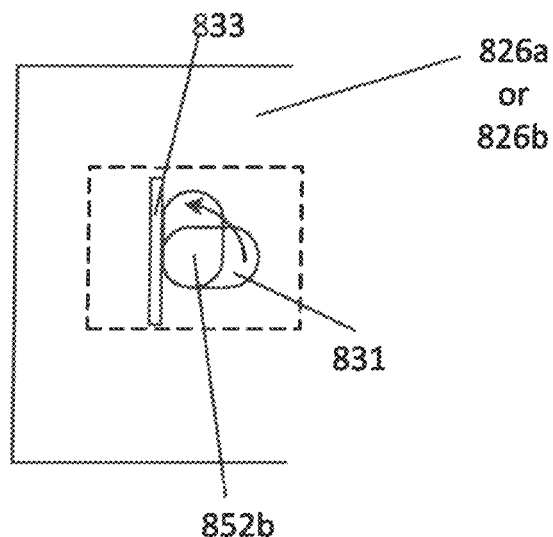
FIGS. 30A and 30B show representative views of an internal side of a housing wall for engaging with the key of FIG. 27 according to an embodiment.
Figure 30B:
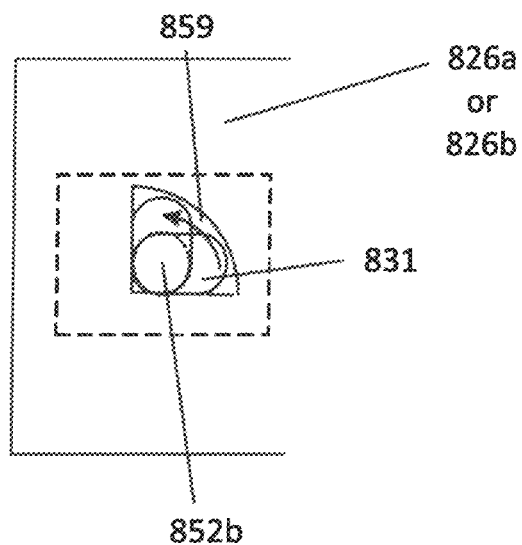

To change the polarity of the connector, the key 830 may be rotated back to its transverse position (dashed line), lifted from the top or bottom walls 826a, 826b, and reinstalled on the opposite surface. To limit rotational movement of the key 830, the interior side of the walls may include a stop member 833, shown in FIG. 30A, which, upon rotation of the key about 90°, is engaged by the arm portion 826b to block further rotation. The stop member may be provided by a thickening of the wall, a projection from the wall, or alternatively, the arm may rotate within a depression 859 extending into the wall from the interior towards the exterior, and which depression may have the shape of a quarter, or half of a circle, so that the sides of the depression may provide rotational stops.

Figure 18A:
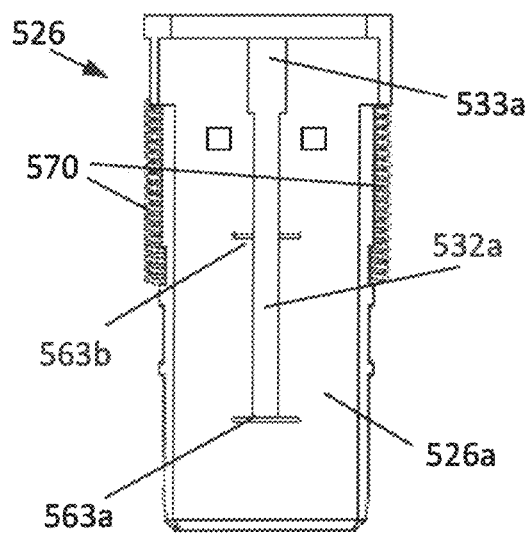
FIGS. 18A-18D show views of the inner and outer housing components of the connector of FIGS. 14A, 14B according to an embodiment.
Figure 18B:
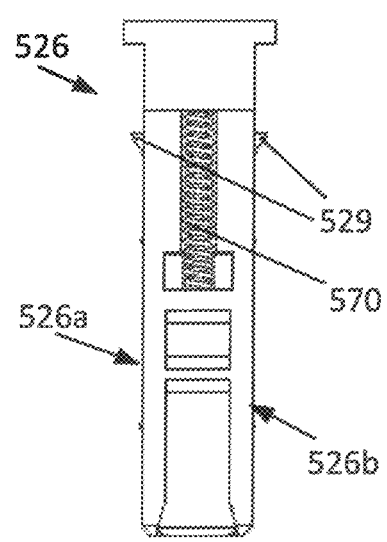
Figure 18C:
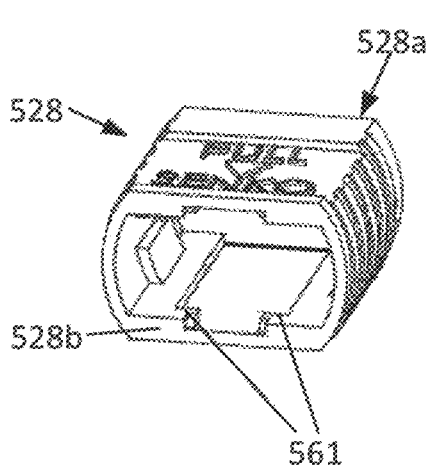
Figure 18D:
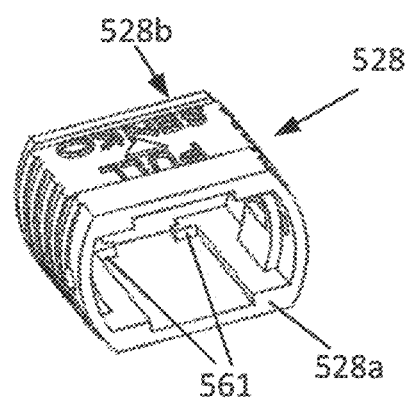

In addition to, or as an alternative to the stop 833, in a manner similar to the embodiments of FIGS. 18A and 20A, a ridge 863 may be provided on the exterior surface of the top and bottom walls 826a and 826b, and the bottom surface of the key body 850 may include a corresponding slot 855 for engaging with the ridge upon rotation of the key 830 into its locked-in position. The ridge/slot configuration may also be configured to provide resistance to minimize inadvertent rotation of a key on the surfaces once a key is 'lock-in'. If a stop 833 is not provided, the ridge/slot configuration would also provide a user a noticeable engagement to indicate a proper alignment of the key on the housing.

In an alternative embodiment (not shown) the shaft 852a may be threaded with at least one circumferential thread and the opening 831 may include a matching thread and rotation of the shaft within the opening may thread the key into and out of the wall in a manner as would be represented by a nut and bolt engagement.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A. B, and C, etc." is used, in general such a construction is intended in the sense one having skill in the art would understand the convention (e.g., "a system having at least one of A. B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber connector comprising:
a ferrule;
an inner housing disposed around at least a portion of the ferrule, the inner housing having a front end portion and a rear end portion spaced apart along an axis, the inner housing having a first side and a second side;
an outer housing disposed around at least a portion of the inner housing;
a key disposed on the first side of the inner housing, the key being configured to slidably move along the inner housing in a range of motion that includes a forward active position and a rear inactive position while the outer housing remains disposed on the inner housing for changing the polarity of the optical fiber connector;
wherein the key and the inner housing comprise mutual restraining elements configured to restrain the key in the forward active position.

2. The optical fiber connector of claim 1 wherein the inner housing comprises a channel extending in a direction between the front end portion and rear end portion of the inner housing.

3. The optical fiber connector of claim 1 wherein the key is configured to slide along the channel.

4. The optical fiber connector of claim 3 wherein at least a portion of the key is received in the channel.

5. The optical fiber connector of claim 1 wherein the key comprises a first key, the optical fiber connector further comprising a second key disposed on the second side of the inner housing.

6. The optical fiber connector of claim 5 wherein the second key is configured to slidably move along the inner housing in a range of motion that includes a forward active position and a rear inactive position for changing the polarity of the optical fiber connector.

7. The optical fiber connector of claim 6, wherein the second key and the inner housing comprise mutual restraining elements configured to restrain the second key in the respective forward active position.

8. The optical fiber connector of claim 7, wherein the inner housing is further configured to restrain the first key and the second key in the respective rear inactive positions.

9. The optical fiber connector of claim 1 wherein the outer housing is configured to slide along the inner housing in a direction extending between the front end portion and rear end portions of the inner housing.

10. The optical fiber connector of claim 9 wherein the outer housing is configured to be retained in a retained position after sliding toward the front end portion of the inner housing.

11. The optical fiber connector of claim 10 further comprising at least one biasing member for biasing the outer housing towards a front of the inner housing.

12. The optical fiber connector of claim 11 wherein the alignment key is locked in place when the outer housing is biased towards the front of the inner housing.

13. The optical fiber connector of claim 1 wherein said connector is an MPO connector.

14. The optical fiber connector of claim 1 wherein the ferrule comprises a first ferrule, the optical fiber connector further comprising a second ferrule, the inner housing extending around at least portions of both the first and second ferrules.

15. The optical fiber connector of claim 1, wherein the mutual restraining elements are configured such that greater force is required to move the key from the forward active position toward the rear inactive position than to move the key from a location along the range of motion between the forward active position and the rear inactive position toward the forward active position.

* * * * *